(12) United States Patent
Droegemueller

(10) Patent No.: US 6,364,561 B1
(45) Date of Patent: Apr. 2, 2002

(54) CONNECTOR SYSTEM FOR EARTH WORKING MACHINES

(76) Inventor: David Scribner Droegemueller, P.O. Box 45, Kersey, CO (US) 80644

( * ) Notice: Subject to any disclaimer, the term of this patent is extended or adjusted under 35 U.S.C. 154(b) by 0 days.

(21) Appl. No.: 09/563,119

(22) Filed: May 2, 2000

Related U.S. Application Data

(60) Provisional application No. 60/136,422, filed on May 28, 1999.

(51) Int. Cl.[7] .................................................. F16B 1/00
(52) U.S. Cl. ............................ 403/4; 403/336; 37/468
(58) Field of Search ...................... 403/3, 4, 11, 335, 403/337, 336, 408.1; 37/468; 414/723

(56) References Cited

U.S. PATENT DOCUMENTS

| | | | | |
|---|---|---|---|---|
| 4,813,163 A | * | 3/1989 | Livingston et al. | 414/723 X |
| 4,948,328 A | * | 8/1990 | Busch | 403/4 X |
| 5,145,313 A | * | 9/1992 | Weyer | 414/723 |
| 5,195,865 A | * | 3/1993 | Koehl | 414/723 |
| 5,546,683 A | * | 8/1996 | Clark | 37/468 |
| 5,791,863 A | * | 8/1998 | Droegemueller | 414/723 |
| 5,927,665 A | * | 7/1999 | Grabnic | 403/4 X |
| 6,108,951 A | * | 8/2000 | Renfrow et al. | 37/468 |
| 6,233,852 B1 | * | 5/2001 | Pemberton | 37/468 |

* cited by examiner

Primary Examiner—Harry C. Kim
(74) Attorney, Agent, or Firm—Dean Edmundson

(57) ABSTRACT

A system is described for connecting a working tool (e.g. a bucket, compactor tool, chisel, etc.) to the outer end of a working arm of a machine. The system includes a pair of spaced-apart upstanding flanges secured to the upper surface of the tool. Each flange includes an elongated slot. A pair of inserts sized to fit in the elongated slots are detachably secured to the flanges. Each insert includes a pair of transverse openings to receive the pins which are used for attaching the tool to the machine. The system enables any tool to be connected to the end of a working arm of any machine.

6 Claims, 7 Drawing Sheets

CONNECTOR SYSTEM FOR EARTH WORKING MACHINES

CROSS-REFERENCE TO RELATED APPLICATION

This application is based upon, and claims the benefit of my Provisional Application No. 60/136,422, filed May 28, 1999.

FIELD OF THE INVENTION

This invention relates to connector systems for mounting a working tool to the end of a working arm on an earth working machine such as an excavator, backhoe, etc.

BACKGROUND OF THE INVENTION

Excavating machines, backhoes, etc. have a large articulated working arm with a tool attached to the free or outer end of the arm. A bucket may be attached to the outer end, or a compactor tool, or a chisel, hammer, etc.

The tool is attached to outer or free end of the articulated arm by means of two heavy pins which must be inserted through registering openings in the arm and the tool. The spacing between pin centers in the arm is determined by each different manufacturer (and different manufacturers use different spacings).

Consequently, it is not possible to connect a bucket, compactor tool, chisel, etc. to the end of a working arm of a machine unless the openings in the tool are the same as the spacing in the end of the working arm.

Typically this means that the buckets, compactors, chisels, etc. of one manufacturer can only be used on a specific manufacturer's machine (unless someone uses specially made adapters which can be connected between the working arm and the tool, or unless someone re-builds the attachment portion of the tool). The unique pin spacing of each manufacturer's machine also causes problems in the rental market because it requires a rental company to stock tools made by several manufacturers.

Further, a contractor who changes the type, make or model of machines he is using then must also change all of his attachments to be able to attach his existing tools to the new machine.

There has not heretofore been provided a connector system which easily enables a single tool to be connected or attached to a variety of machines made by different manufacturers.

SUMMARY OF THE INVENTION

In accordance with the present invention there is provided a connector system in which the tool includes upstanding flanges each having an elongated open slot. An insert fits into each open slot and is bolted securely in place. The insert includes a pair of transverse openings or apertures through it for receiving the pins used to connect the tool to the working arm of a machine (e.g. an excavator).

Inserts are provided which have the appropriate pin hole spacings required for a particular manufacturer's machine. Thus, by changing the inserts, a single tool can be made to connect to the working arm of a machine made by any manufacturer. No costly re-work of the attachment is required.

Other features and advantages of the connector system of the invention will be apparent from the following detailed description and the accompanying drawings.

BRIEF DESCRIPTION OF THE DRAWINGS

The invention is described in more detail hereafter with reference to the accompanying drawings, wherein like reference characters refer to the same parts throughout the several views and in which.

DETAILED DESCRIPTION OF THE INVENTION

Figure 1:
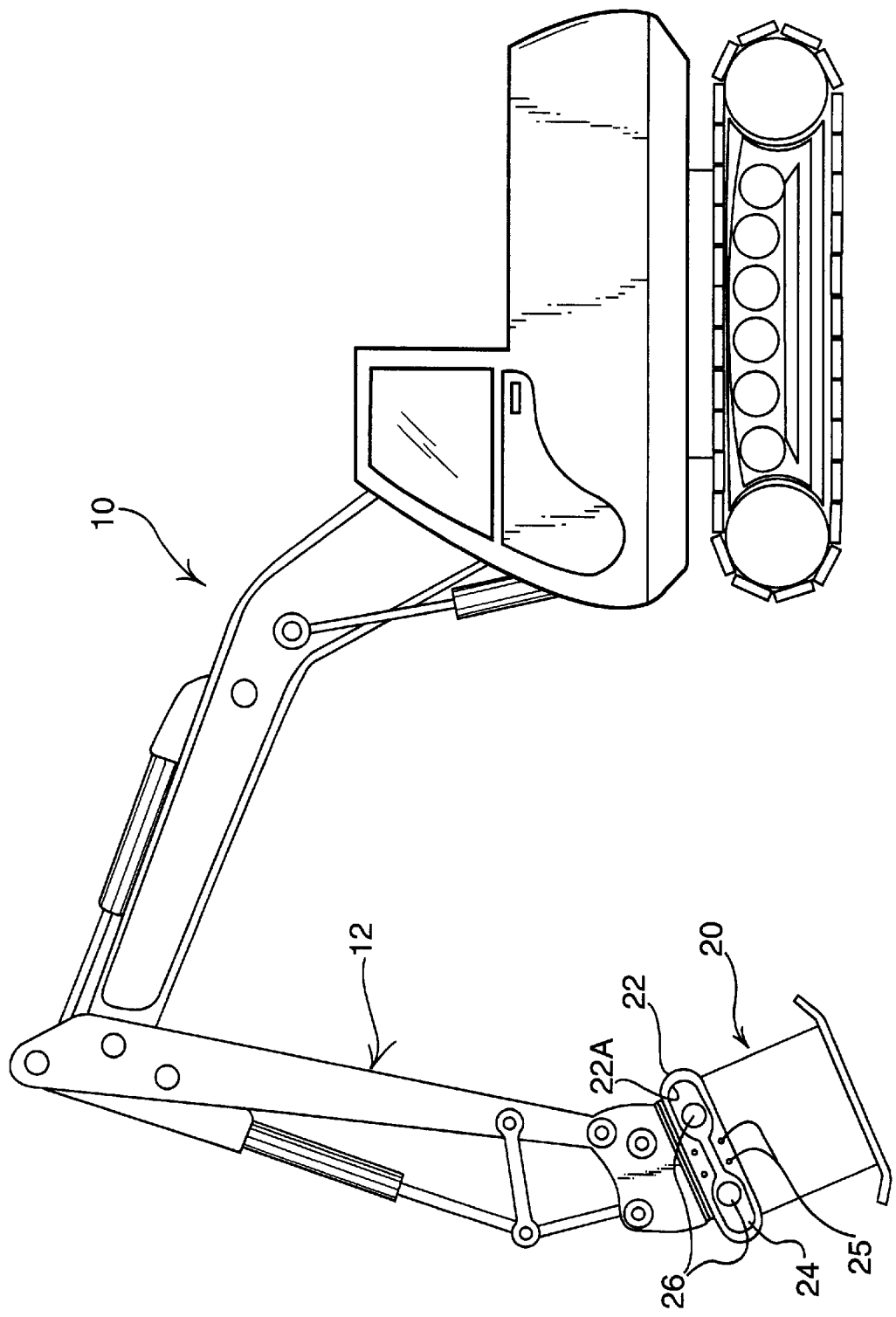
FIG. 1 is a side elevational view of a machine having a working arm with a compactor tool connected to its outer end using one embodiment of a system of the invention.

In FIG. 1 there is illustrated an earth-working machine 10 having an elongated working arm 12. At the outer end of the working arm there is attached a compactor tool 20. The top surface of the compactor tool includes a flange or template 22 welded on each side thereof. The template includes an elongated slot or aperture 22A. Inserted into each slot 22A is an insert 24 which is bolted securely to the template by means of bolts 25. The insert includes openings for receiving pins 26 which attach the compactor to the outer end of the working arm 12. The spacing between the pin openings in the insert 24 exactly matches the spacing between the pins 26 (which spacing is determined by the manufacturer of the machine 10).

Figure 2:
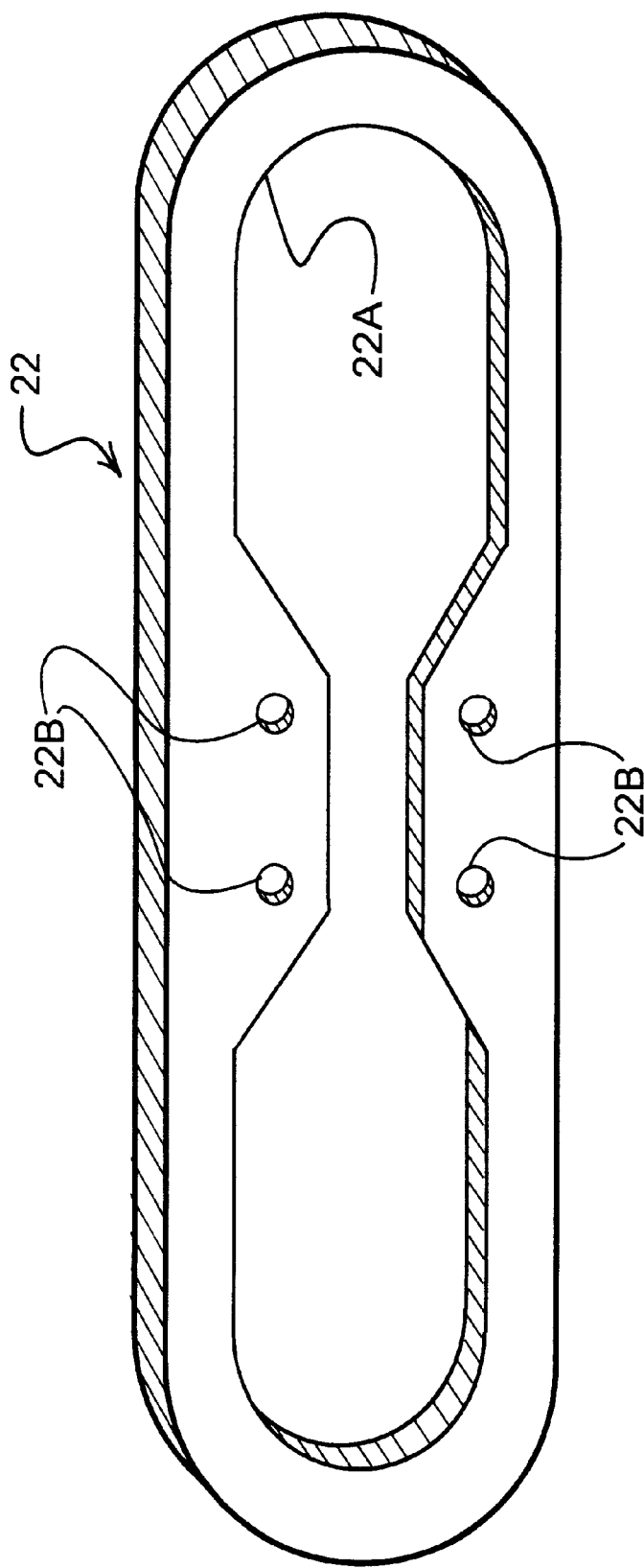
FIG. 2 is a side elevational view of a receiver template which can be welded to the top surface of a tool.

FIG. 2 is a perspective view of one of the templates 22 which includes an elongated slot or aperture 22A. The template includes bolt holes 22B to enable a desired insert 24 to be bolted into the template. A pair of these templates 22 can be welded to the top surface of any desired tool (e.g. a compactor, a bucket, a chisel, etc.) to provide parallel upstanding spaced-apart flanges as illustrated in the drawings.

Figure 3:
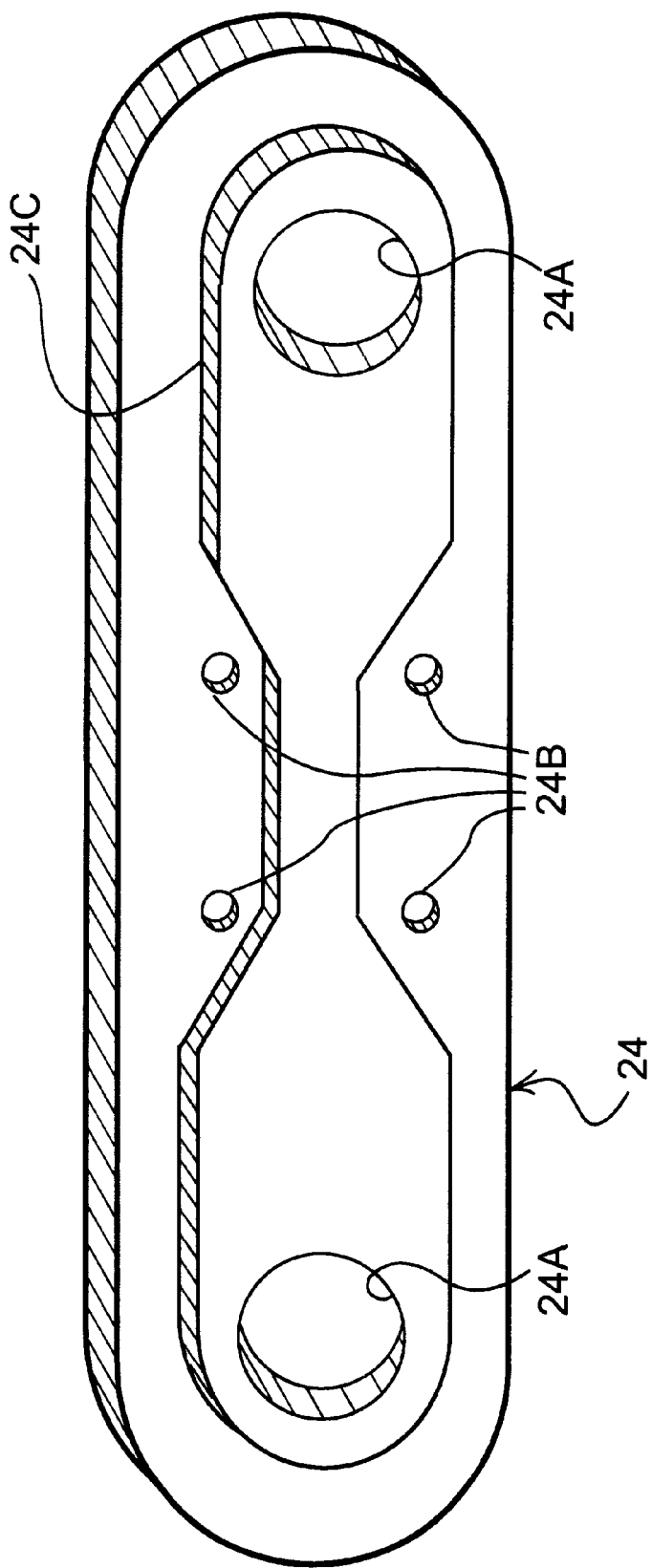
FIG. 3 shows one embodiment of an insert which can be bolted into one of the receiver templates of FIG. 2.

FIG. 3 is a perspective view of one embodiment of insert 24 which is used in the system of the invention. The insert includes openings 24A for receiving the pins needed to attach a tool to the outer end of a working arm of a machine. The insert can be bolted into the slot 22A of a template 22. The boss (i.e. raised plateau) 24C on one side surface of the insert has a configuration or shape which corresponds to the shape of the opening or slot in the template 22.

The spacing between openings 24A in the insert can be established so as to match the spacing between the pin locations in the outer end of the working arm of any particular machine. This spacing may vary from one manufacturer to another. Therefore, different inserts are used when attaching a tool to machines of different manufacturers.

Figure 4:
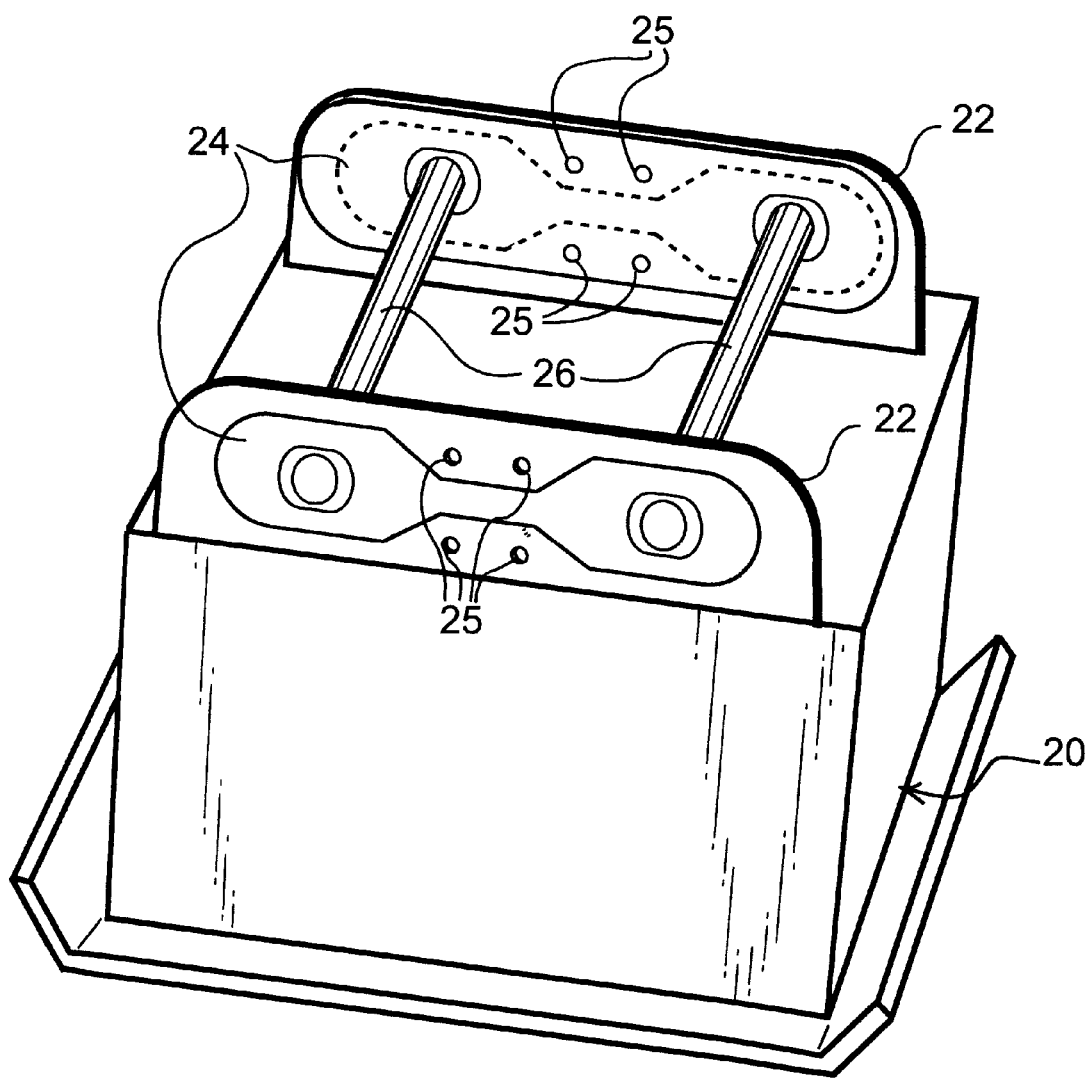
FIG. 4 is a perspective view of a compactor tool employing the connector system of the invention.

FIG. 4 is a perspective view of a compactor tool 20 with a pair of spaced-apart templates 22 welded to the top surface. An insert 24 is bolted into the slot in each template with bolts 25. Pins 26 are for the purpose of attaching the tool to the outer end of a working arm of a machine.

Figure 5:
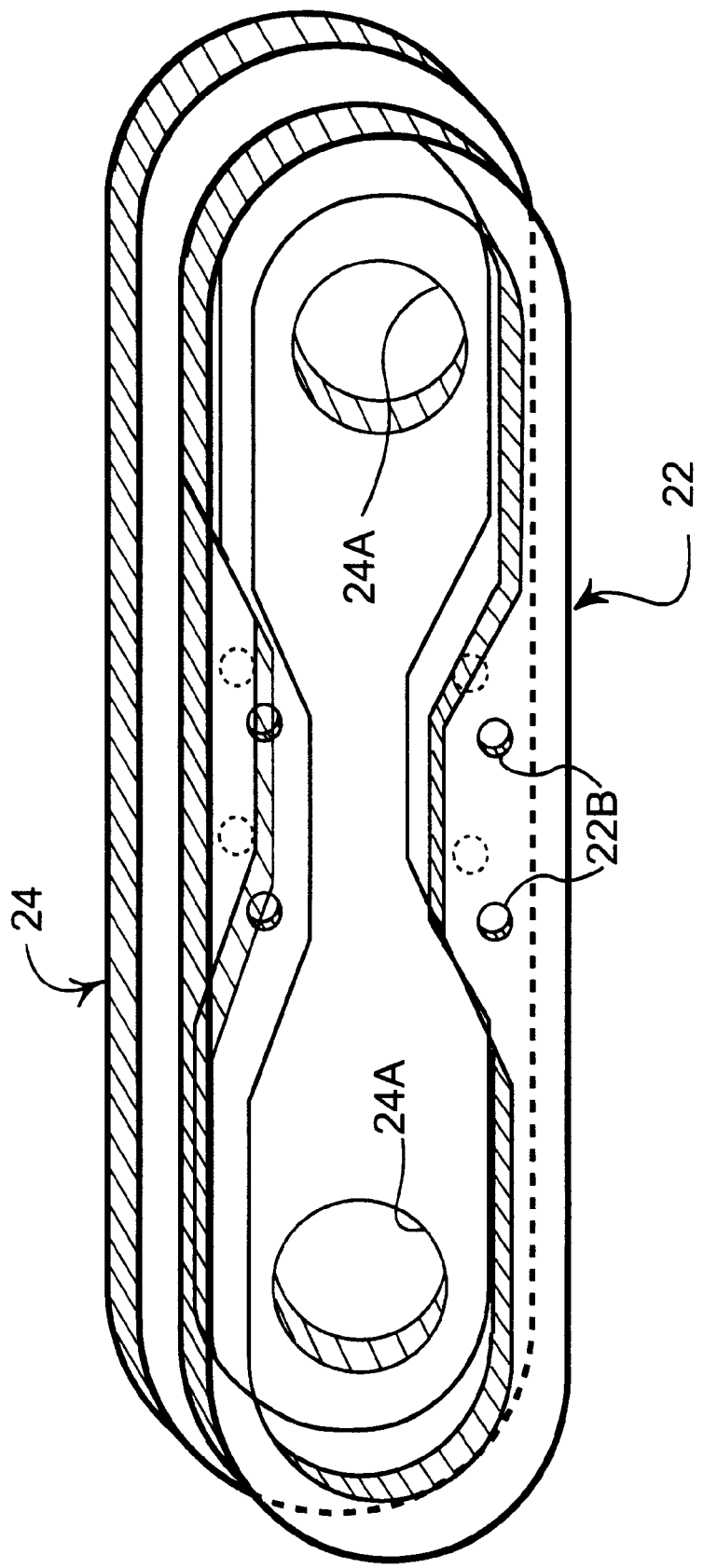
FIG. 5 is a perspective view illustrating one of the inserts positioned in one of the receiver templates used in the present invention.

FIG. 5 illustrates an insert 24 and a receiver template 22. The insert fits into the slot in the template and is bolted to the template with bolts in registering openings in the insert and the template.

Figure 6:
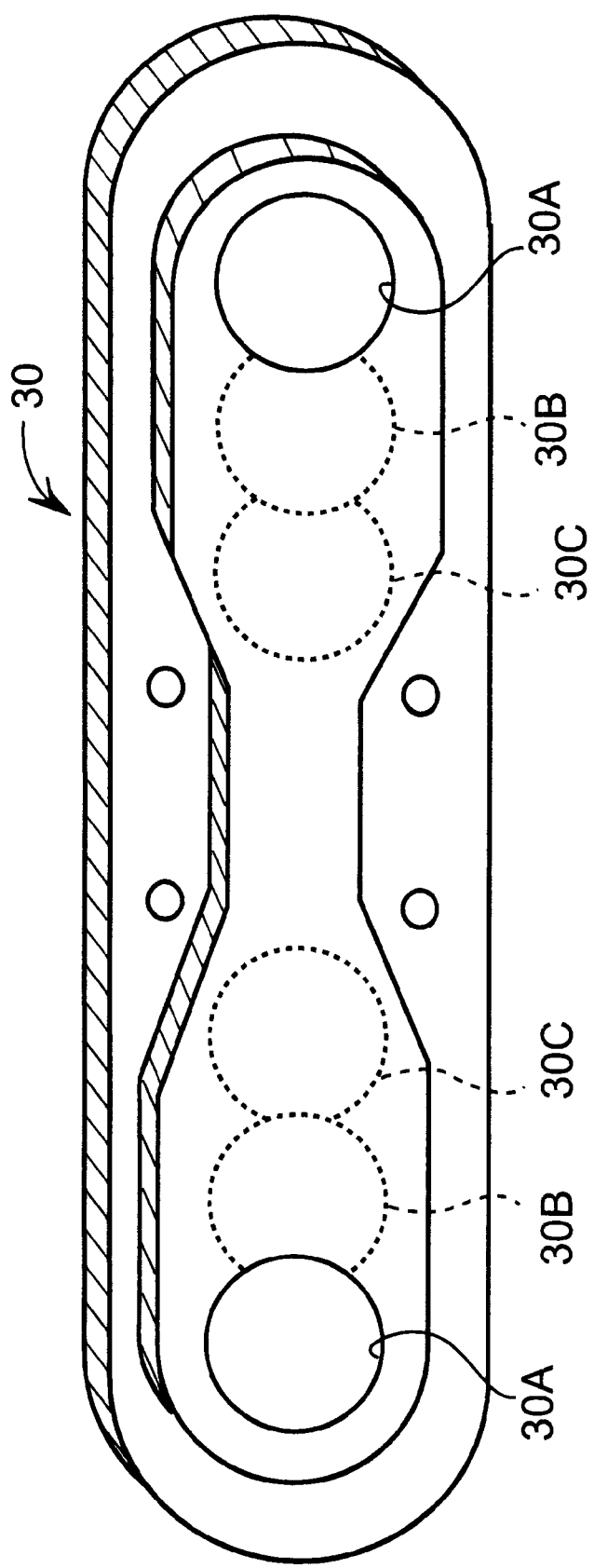
FIGS. 6 and 6A illustrate the inserts useful in this invention.
Figure 6A:
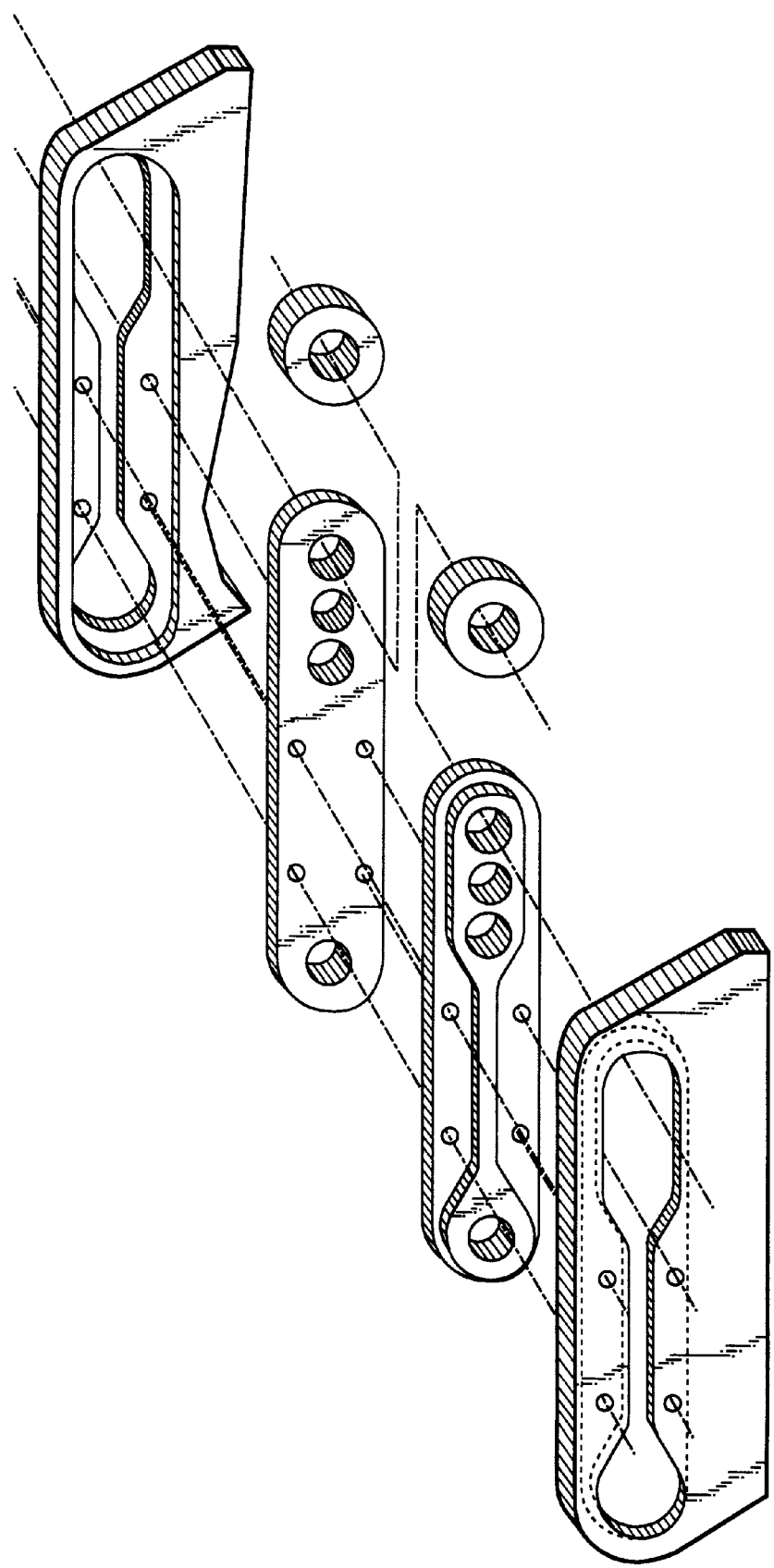

FIGS. 6 and 6A illustrate an insert 30 of the invention with pin openings 30A. Alternative placement or locations of the pin openings are shown as 30B and 30C, depending upon the desired location for pins used to attach a tool to a working arm of a machine.

The use of the system of this invention enables contractors, dealers and manufacturers great flexibility in the type of machines being used with the same tools or attachments. All of the existing tools or attachments can easily be made to accept the connecting arm of the machine. Also, worn bushings and boss units can be easily replaced on the tool.

Other variants are possible without departing from the scope of this invention. For example, the spacing between the flanges or templates on a tool can be changed as necessary to accommodate the bosses on the inserts.

What is claimed is:

1. A connector system in combination with a working tool for connecting said working tool to a working arm of a machine, the system comprising:
   (a) first and second spaced-apart upstanding flanges or templates secured to said tool; wherein each said flange includes a single elongated slot therethrough;
   (b) first and second inserts sized to fit, respectively, in one of said elongated slots in said first and second flanges, wherein each said insert is detachably secured directly to one of said flanges and includes at least two transverse openings therein to receive pins for attaching said tool to said working arm of said machine.

2. A connector system in accordance with claim 1, wherein said inserts are secured to said flanges by means of bolts.

3. A connector system in accordance with claim 1, wherein said flanges are parallel to each other.

4. A connector system in combination with a working tool for connecting said working tool to a working arm of a machine, wherein said working tool includes an upper surface, the system comprising:
   (a) first and second spaced-apart, parallel, upstanding flanges secured to said upper surface of said tool; wherein each said flange includes an elongated recessed area; wherein each said flange also includes a single elongated slot therethrough within said recessed area;
   (b) first and second inserts sized to fit, respectively, within one of said recessed areas in said first and second flanges, wherein each said insert includes a raised area sized to fit within said elongated slot in one of said flanges; wherein each said insert is detachably secured directly to one of said flanges and includes at least two transverse openings therein to receive pins for attaching said tool to said working arm of said machine.

5. A connector system in accordance with claim 4, wherein each said insert is secured directly to a respective one of said flanges by means of bolts extending through registering openings in said flanges and said inserts.

6. A connector system in accordance with claim 5, wherein each said elongated slot includes first and second enlarged ends.

* * * * *